United States Patent
Dong

(10) Patent No.: US 8,331,801 B2
(45) Date of Patent: Dec. 11, 2012

(54) DUAL RATE RECEIVING DEVICE

(75) Inventor: Ke Dong, Chengdu (CN)

(73) Assignee: Superxon (Chengdu) Technology Ltd. (CN)

( * ) Notice: Subject to any disclaimer, the term of this patent is extended or adjusted under 35 U.S.C. 154(b) by 363 days.

(21) Appl. No.: 12/867,621

(22) PCT Filed: Aug. 9, 2010

(86) PCT No.: PCT/CN2010/075793
§ 371 (c)(1),
(2), (4) Date: Aug. 13, 2010

(87) PCT Pub. No.: WO2011/134213
PCT Pub. Date: Nov. 3, 2011

(65) Prior Publication Data
US 2011/0293283 A1    Dec. 1, 2011

(30) Foreign Application Priority Data

Apr. 28, 2010  (CN) .......................... 2010 1 0157995

(51) Int. Cl.
*H04B 10/06* (2006.01)

(52) U.S. Cl. .......................... 398/202; 398/135; 398/128

(58) Field of Classification Search .................. 398/202, 398/203, 204, 135, 138, 128, 130
See application file for complete search history.

(56) References Cited

U.S. PATENT DOCUMENTS

| 7,242,871 B2 * | 7/2007 | Huang et al. .................. 398/210 |
| 7,620,331 B2 * | 11/2009 | Schrodinger ................. 398/202 |
| 8,017,901 B2 * | 9/2011 | Mizoguchi et al. ....... 250/214 R |
| 8,045,860 B2 * | 10/2011 | Matsui et al. ................. 398/135 |

FOREIGN PATENT DOCUMENTS

| CN | 2822041 Y | 9/2006 |
| CN | 101355388 A | 1/2009 |
| WO | WO 2004/073215 A1 | 8/2004 |

OTHER PUBLICATIONS

International Search Report for PCT/CN2010/075793 dated Feb. 3, 2011, 3 pgs.

* cited by examiner

*Primary Examiner* — M. R. Sedighian
(74) *Attorney, Agent, or Firm* — Morgan, Lewis & Bockius LLP

(57) ABSTRACT

A dual rate receiving device is provided, which is applicable to an optical transceiver module, and includes a dual rate optical receiving component, a channel switching circuit, a low-speed limiting amplifier data path, and a high-speed limiting amplifier data path. The dual rate optical receiving component further includes a photodetector and a dual rate transimpedance amplifier, the channel switching circuit further includes a first controllable switch, a second controllable switch, a third controllable switch, and a fourth controllable switch, the low-speed limiting amplifier data path further includes a low-speed limiting amplifier, and the high-speed limiting amplifier data path further includes a high-speed limiting amplifier. The technical solution is adopted, so that while an optical receiving component is working at the most suitable rate, a limiting amplifier data path at a corresponding working rate can be selected, so as to implement a high sensitivity.

8 Claims, 2 Drawing Sheets

DUAL RATE RECEIVING DEVICE

CROSS REFERENCE TO RELATED APPLICATIONS

This Application is a United States National Stage Application filed under 35 U.S.C. §371 of PCT Patent Application Serial No. PCT/CN2010/075793 filed on Aug. 9, 2010, which claims the benefit of and priority to Chinese Patent Application Serial No. 201010157995.4 filed on Apr. 28, 2010, both of which are hereby incorporated by reference in their entireties.

BACKGROUND OF THE INVENTION

1. Field of the Invention

The present invention relates to the field of optical communication technology, and more particularly to a dual rate receiving device.

2. Background of the Invention

An optical communication apparatus generally works at various working rates, which requires that an optical transceiver module can work at various rates, so that difficulties are brought to the practical circuit design. To be compatible with a high rate application, devices of the optical transceiver module need to satisfy requirements of high rate and wide bandwidth. However, when the devices with the high rate and the wide bandwidth work at a low rate, a sensitivity index is generally unsatisfactory.

The contradiction is particularly prominent in a dual rate receiver of a 10-Gigabit Ethernet passive optical network optical line terminal optical transceiver module. To be compatible with an existing Gigabit Ethernet passive optical network optical network unit apparatus, in the 10-Gigabit Ethernet passive optical network optical line terminal optical transceiver module, 10.3125 Gbps and 1.25 Gbps burst optical signals need to be received. If it is optimally designed that the receiver works at a high-speed rate of 10.3125 Gbps, a receiving sensitivity at 1.25 Gbps is degraded. On the contrary, performances of the high rate receiver cannot be guaranteed.

Furthermore, when the receiver works in a burst working state, a dual rate optical receiving component and a subsequent signal amplifying circuit need to implement conversion of a burst signal within the time smaller than 400 ns. The working mode brings difficulties to apparatus selection. Bandwidth switching circuits of chips of a business class trans-impedance amplifier and a limiting amplifier cannot satisfy the requirement of 400 ns rate switching.

SUMMARY OF THE INVENTION

Accordingly, the present invention is directed to a dual rate receiving device, so that while an optical receiving component is working at the most suitable rate, a limiting amplifier data path at a corresponding working rate can be selected, so as to implement a high sensitivity.

In order to achieve the objective, the present invention adopts the following technical solution.

A dual rate receiving device, applicable to an optical transceiver module, is provided. The dual rate receiving device includes a dual rate optical receiving component, a channel switching circuit, a low-speed limiting amplifier data path, and a high-speed limiting amplifier data path. The dual rate optical receiving component further includes a photodetector and a dual rate trans-impedance amplifier, the channel switching circuit further includes a first controllable switch, a second controllable switch, a third controllable switch, and a fourth controllable switch, the low-speed limiting amplifier data path further includes a low-speed limiting amplifier, and the high-speed limiting amplifier data path further includes a high-speed limiting amplifier.

An output end of the photodetector is connected with an input end of the dual rate trans-impedance amplifier for converting a received optical signal into a photocurrent and sending the photocurrent to the dual rate trans-impedance amplifier.

An output end of the dual rate trans-impedance amplifier is connected with an input end of the first controllable switch, an input end of the second controllable switch, an input end of the third controllable switch, and an input end of the fourth controllable switch respectively for generating a differential data signal, a data positive end of the differential data signal is connected with the input end of the first controllable switch and the input end of the second controllable switch respectively, and a data negative end of the differential data signal is connected with the input end of the third controllable switch and the input end of the fourth controllable switch respectively.

An output end of the first controllable switch is connected with a data positive input end of the low-speed limiting amplifier.

An output end of the second controllable switch is connected with a data positive input end of the high-speed limiting amplifier.

An output end of the third controllable switch is connected with a data negative input end of the low-speed limiting amplifier.

An output end of the fourth controllable switch is connected with a data negative input end of the high-speed limiting amplifier.

An output end of the low-speed limiting amplifier and an output end of the high-speed limiting amplifier are respectively connected with a system host for amplifying respectively received differential data signals and then respectively sending the signals to the system host.

A control end of the first controllable switch, a control end of the second controllable switch, a control end of the third controllable switch, and a control end of the fourth controllable switch are respectively connected with the system host for acquiring a rate selection control signal from the system host, so as to control switch-on or switch-off of the first controllable switch, the second controllable switch, the third controllable switch, and the fourth controllable switch.

The low-speed limiting amplifier data path further includes a low pass filtering circuit, the output end of the first controllable switch is connected with a data positive input end of the low pass filtering circuit, and the output end of the third controllable switch is connected with a data negative input end of the low pass filtering circuit.

An output end of the low pass filtering circuit is connected with an input end of the low-speed limiting amplifier for filtering and removing a high-frequency noise of the dual rate trans-impedance amplifier.

The channel switching circuit further includes a first alternating current (AC) coupling capacitor and a second AC coupling capacitor, a data positive end of a differential data signal output by the dual rate trans-impedance amplifier is connected with an input end of the first AC coupling capacitor, and the input end of the first controllable switch and the input end of the second controllable switch are connected together to be connected with an output end of the first AC coupling capacitor, for isolating the dual rate trans-impedance amplifier from a data positive end direct current (DC)

working level of the high-speed limiting amplifier data path and the low-speed limiting amplifier data path.

A data negative end of the differential data signal output by the dual rate trans-impedance amplifier is connected with an input end of the second AC coupling capacitor, and the input end of the third controllable switch and the input end of the fourth controllable switch are connected together to be connected with an output end of the second AC coupling capacitor, for isolating the dual rate trans-impedance amplifier from a data negative end DC working level of the high-speed limiting amplifier data path and the low-speed limiting amplifier data path.

The dual rate receiving device further includes a bias voltage circuit, an output end of the bias voltage circuit is connected with an input end of the photodetector for generating a bias voltage required by the photodetector.

The photodetector is a positive-intrinsic-negative (PIN) photo diode or avalanche photo diode (APD).

The bias voltage circuit is a PIN photo diode bias voltage circuit or APD bias voltage circuit.

In the technical solution, through proper technical modifications, the dual rate optical receiving component and the channel switching circuit, the channel switching circuit and the low-speed limiting amplifier data path, the channel switching circuit and the high-speed limiting amplifier data path, as well as a data output of the optical transceiver module and the system host are connected through DC coupling or AC coupling in a single-end or differential manner.

As an application in a dual rate receiver of a 10-Gigabit Ethernet passive optical network of the technical solution, the dual rate trans-impedance amplifier is a 10 G/1.25 G trans-impedance amplifier, the low-speed limiting amplifier is a 1.25 G limiting amplifier, and the high-speed limiting amplifier is a 10 G limiting amplifier.

Through the technical solution of the present invention, under the control of the rate selection control signal, different limiting amplifier data paths are switched, and the selected low-speed and high-speed limiting amplifiers are mature devices with the cheap price, the convenient implementation, and the good receiving performance.

DETAILED DESCRIPTION OF THE INVENTION

The technical solution according to the present invention is further illustrated hereinafter in combination with accompanying drawings and an embodiment.

Figure 1:
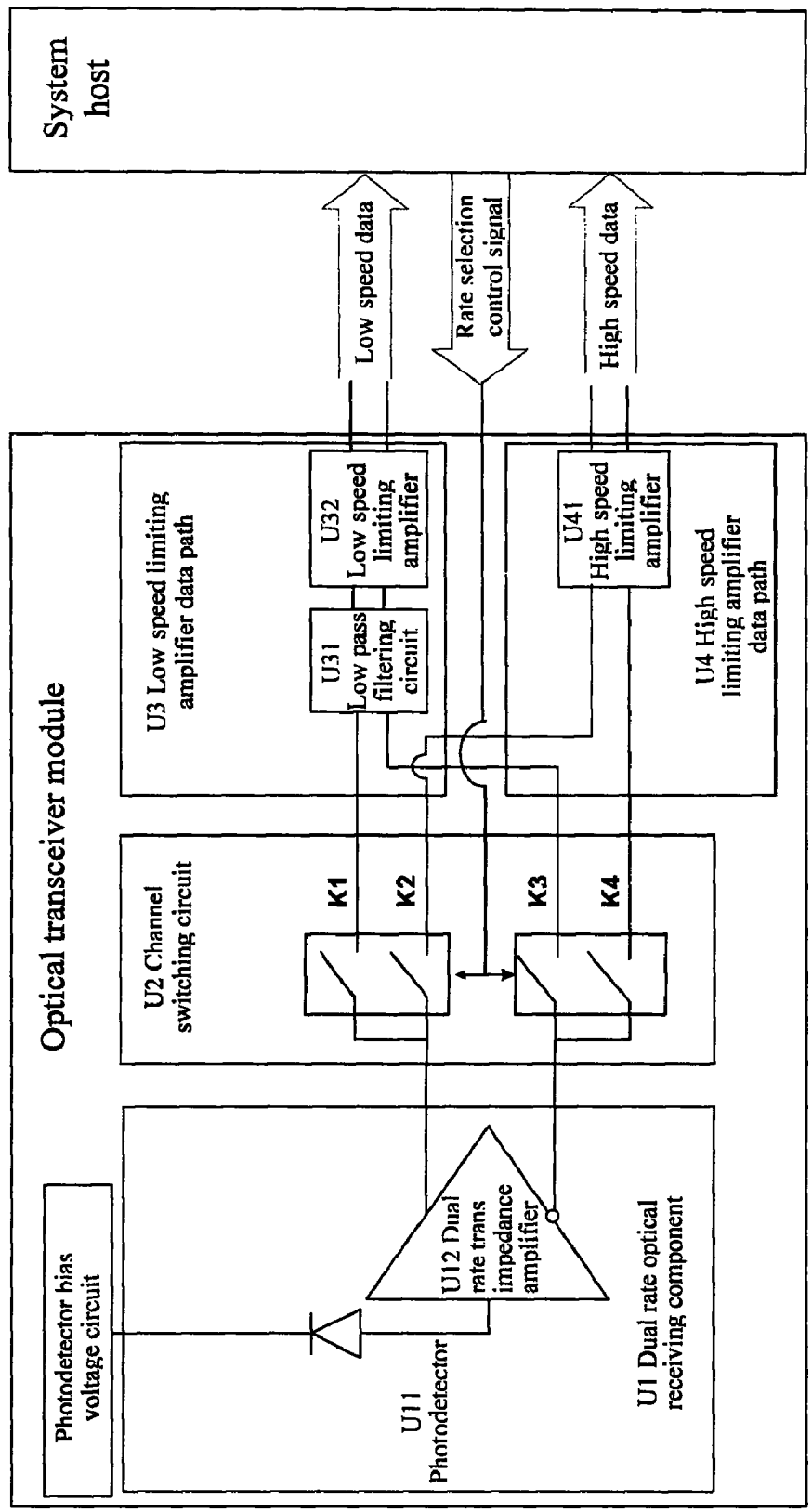
FIG. 1 is a schematic structural view of a dual rate receiving device according to the present invention.

FIG. 1 is a schematic structural view of a dual rate receiving device according to the present invention. As shown in FIG. 1, a dual rate receiving device is located in an optical transceiver module, and includes a U1 dual rate optical receiving component, a U2 channel switching circuit, a U3 low-speed limiting amplifier data path, and a U4 high-speed limiting amplifier data path.

The dual rate optical receiving component and the channel switching circuit, the channel switching circuit and the low-speed limiting amplifier data path, the channel switching circuit and the high-speed limiting amplifier data path, as well as a data output of the optical transceiver module and a system host are connected through DC coupling or AC coupling in a single-end or differential manner.

The dual rate optical receiving component further includes a U11 photodetector and a U12 dual rate trans-impedance amplifier, the channel switching circuit further includes a K1 first controllable switch, a K2 second controllable switch, a K3 third controllable switch, and a K4 fourth controllable switch, the low-speed limiting amplifier data path further includes a U32 low-speed limiting amplifier, and the high-speed limiting amplifier data path further includes a U41 high-speed limiting amplifier.

Specific connection relationships are described as follows.

The photodetector is a PIN photo diode or APD, an output end of the photodetector is connected with an input end of the dual rate trans-impedance amplifier, and the photodetector converts a received optical signal into a photocurrent and sends the photocurrent to the dual rate trans-impedance amplifier.

An output end of the dual rate trans-impedance amplifier is connected with an input end of the first controllable switch, an input end of the second controllable switch, an input end of the third controllable switch, and an input end of the fourth controllable switch respectively, the dual rate trans-impedance amplifier generates a differential data signal, a data positive end of the differential data signal is connected with the input end of the first controllable switch and the input end of the second controllable switch respectively, and a data negative end of the differential data signal is connected with the input end of the third controllable switch and the input end of the fourth controllable switch respectively.

An output end of the first controllable switch is connected with a data positive input end of the low-speed limiting amplifier.

An output end of the second controllable switch is connected with a data positive input end of the high-speed limiting amplifier.

An output end of the third controllable switch is connected with a data negative input end of the low-speed limiting amplifier.

An output end of the fourth controllable switch is connected with a data negative input end of the high-speed limiting amplifier.

An output end of the low-speed limiting amplifier and an output end of the high-speed limiting amplifier are respectively connected with the system host, and the low-speed limiting amplifier and the high-speed limiting amplifier amplify respectively received differential data signals and then respectively send the signals to the system host.

A control end of the first controllable switch, a control end of the second controllable switch, a control end of the third controllable switch, and a control end of the fourth controllable switch are respectively connected with the system host, and the first controllable switch, the second controllable switch, the third controllable switch, and the fourth controllable switch acquire a rate selection control signal from the system host to control switch-on or switch-off of the first controllable switch, the second controllable switch, the third controllable switch, and the fourth controllable switch.

Further, the low-speed limiting amplifier data path can further include a U31 low pass filtering circuit, the output end of the first controllable switch is connected with a data positive input end of the low pass filtering circuit, and the output end of the third controllable switch is connected with a data negative input end of the low pass filtering circuit. An output end of the low pass filtering circuit is connected with an input end of the low-speed limiting amplifier, and the low pass filtering circuit can filter and remove a high-frequency noise of the dual rate trans-impedance amplifier, thereby increasing a receiving circuit sensitivity.

Figure 2:
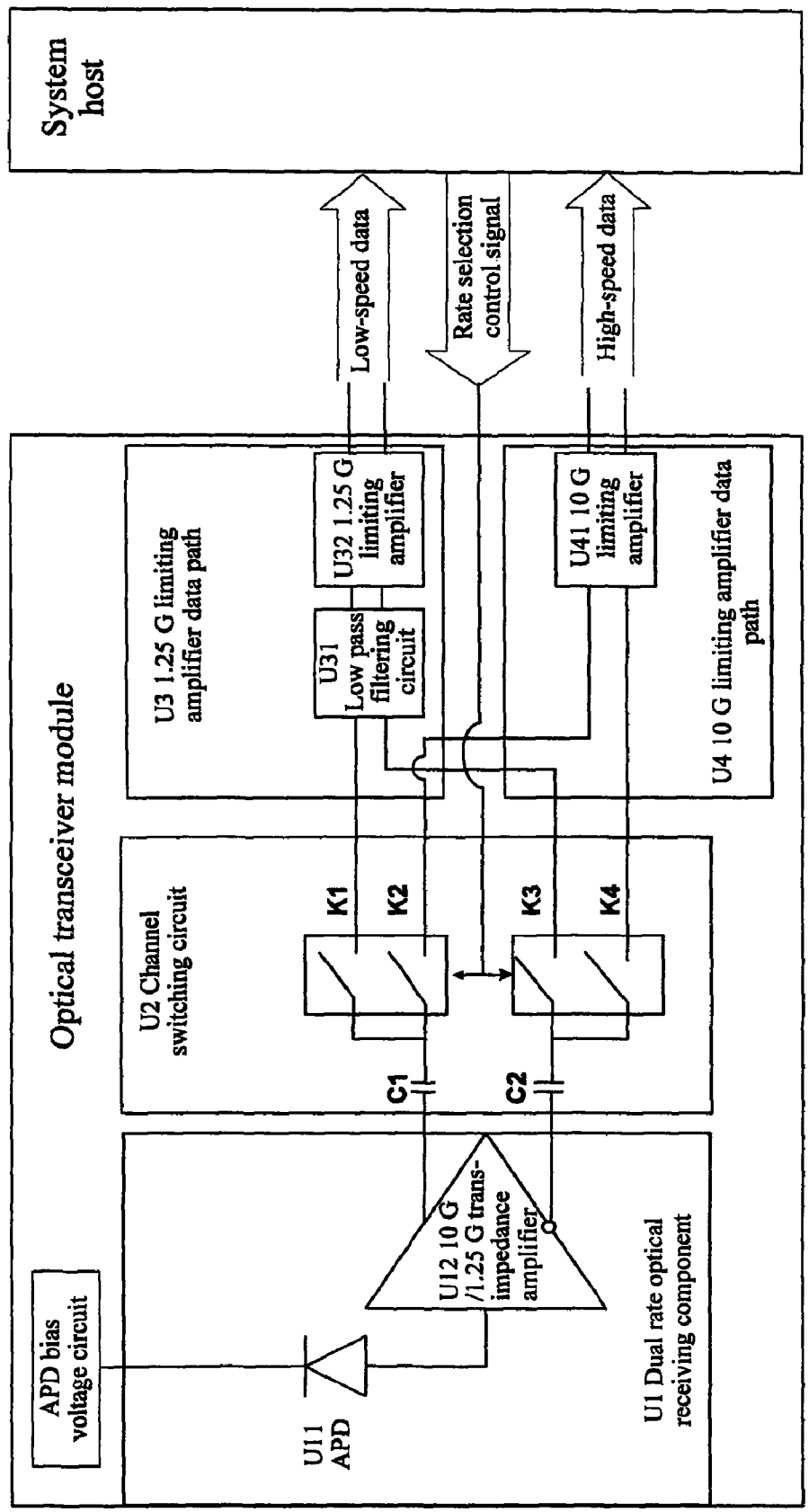
FIG. 2 is a schematic structural view of a dual rate receiving device according to an embodiment of the present invention.

FIG. 2 is a schematic structural view of a dual rate receiving device according to an embodiment of the present invention. As shown in FIG. 2, ahead of a photodetector, the dual rate receiving device further includes a bias voltage circuit, and an output end of the bias voltage circuit is connected with an input end of the photodetector, in which the bias voltage circuit is capable of generating a bias voltage required by the photodetector.

The bias voltage circuit is a PIN photo diode bias voltage circuit or APD bias voltage circuit for generating a bias voltage required by a PIN photo diode or APD.

A U1 dual rate optical receiving component is a 10 G/1.25 G dual rate optical receiving component, which includes a U11 APD and a U12 10 G/1.25 G trans-impedance amplifier. The 10 G/1.25 G dual rate optical receiving component can work at rates of 1.25 Gbps and 10 Gbps.

A U2 channel switching circuit includes a K1 first controllable switch, a K2 second controllable switch, a K3 third controllable switch, and a K4 fourth controllable switch, and further includes a C1 first AC coupling capacitor and a C2 second AC coupling capacitor.

A data positive end of a differential data signal output by a dual rate trans-impedance amplifier is connected with an input end of the first AC coupling capacitor, and an input end of the first controllable switch and an input end of the second controllable switch are connected together to be connected with an output end of the first AC coupling capacitor, for isolating the dual rate trans-impedance amplifier from a data positive end DC working level of a high-speed limiting amplifier data path and a low-speed limiting amplifier data path. A data negative end of the differential data signal output by the dual rate trans-impedance amplifier is connected with an input end of the second AC coupling capacitor, and an input end of the third controllable switch and an input end of the fourth controllable switch are connected together to be connected with an output end of the second AC coupling capacitor, for isolating the dual rate trans-impedance amplifier from a data negative end DC working level of the high-speed limiting amplifier data path and the low-speed limiting amplifier data path.

To implement burst data receiving smaller than 400 ns and guarantee a data path of a 10 G rate, the K1 first controllable switch, the K2 second controllable switch, the K3 third controllable switch, and the K4 fourth controllable switch must satisfy conditions of high bandwidth (analog bandwidth is larger than 7 GHZ) and fast response (switch-on and switch-off time of a switch is smaller than 400 ns).

The U2 channel switching circuit accepts control of a rate selection control signal sent by a system host, so as to implement data channel switching between 10 G and 1.25 G.

A U3 low-speed limiting amplifier data path is a 1.25 G limiting amplifier data path, which includes a U31 low pass filtering circuit and a U32 1.25 G limiting amplifier.

3 dB bandwidth of the U31 low pass filter is set to be about 800 MhZ-1 GHZ for filtering and removing a high-frequency noise.

A U4 low-speed limiting amplifier data path is a 10 G limiting amplifier data path, which includes a U41 10 G limiting amplifier.

The rate selection control signal is generated by the system host for controlling data path switching of the channel switching circuit. Two pairs of differential data of the 1.25 G and 10 G data paths in a receiving circuit are connected with the system host.

A working procedure of the dual rate receiving device is introduced in detail hereinafter.

The APD bias voltage circuit is connected with the U11 APD to provide a bias voltage for the U11 APD.

The U11 APD converts a received optical signal into a photocurrent, and sends a photocurrent signal to the U12 10 G/1.25 G trans-impedance amplifier.

The U12 10 G/1.25 G trans-impedance amplifier converts the received photocurrent signal into a differential voltage signal.

A data positive end (Data+) of the differential data signal output by the U12 10 G/1.25 G trans-impedance amplifier is connected with the C1 first AC coupling capacitor, the input end of the K1 first controllable switch and that of the K2 second controllable switch are connected together and form a first group of switch to be connected with the C1 first AC coupling capacitor, an output end of the K1 first controllable switch is connected with a data positive (Data+) input end of the U31 low pass filtering circuit, and an output end of the K2 second controllable switch is connected with a data positive (Data+) input end of the U41 10 G limiting amplifier.

A data negative end (Data−) of the differential data signal output by the U12 10 G/1.25 G trans-impedance amplifier is connected with the C2 second AC coupling capacitor, the input end of the K3 third controllable switch and that of the K4 fourth controllable switch are connected together and form a second group of switch to be connected with the C2 second AC coupling capacitor, an output end of the K3 third controllable switch is connected with a data negative (Data−) input end of the U31 low pass filtering circuit, and an output end of the K4 fourth controllable switch is connected with a data negative (Data−) input end of the U41 10 G limiting amplifier.

Control ends of the K1 first controllable switch, the K2 second controllable switch, the K3 third controllable switch, and the K4 fourth controllable switch are connected with the system host to receive the rate selection control signal sent by the system host.

When the rate selection control signal generated by the system host is gated by the high-speed limiting amplifier data path, the K2 second controllable switch and the K4 fourth controllable switch are switched on, while the K1 first controllable switch and the K3 third controllable switch are switched off. After being amplified by the U41 high-speed limiting amplifier, the differential data signal generated by the U12 dual rate trans-impedance amplifier is sent to the system host.

When the rate selection control signal generated by the system host is gated by the low-speed limiting amplifier data path, the K1 first controllable switch and the K3 third controllable switch are switched on, while the K2 second controllable switch and the K4 fourth controllable switch are switched off. After passing through the U31 low pass filter filtering and being amplified by the U32 low-speed limiting amplifier, the differential data signal generated by the U12 dual rate trans-impedance amplifier is sent to the system host. An output end of the U31 low pass filtering circuit is connected with the U32 low-speed limiting amplifier in a differential DC coupling manner, so as to filter and remove the high-frequency noise.

In conclusion, the above description is merely the preferred embodiment of the present invention. However, the scope of the present invention is not limited thereto. Changes or replacements readily apparent to persons skilled in the prior art within the technical scope of the present invention should fall within the scope of the present invention. Therefore, the protection scope of the present invention is subject to the appended claims.

What is claimed is:

1. A dual rate receiving device, applicable to an optical transceiver module, comprising a dual rate optical receiving component, a channel switching circuit, a low-speed limiting amplifier data path, and a high-speed limiting amplifier data path, wherein the dual rate optical receiving component further comprises a photodetector and a dual rate trans-impedance amplifier, the channel switching circuit further comprises a first controllable switch, a second controllable switch, a third controllable switch, and a fourth controllable switch, the low-speed limiting amplifier data path further comprises a low-speed limiting amplifier, and the high-speed limiting amplifier data path further comprises a high-speed limiting amplifier, wherein an output end of the photodetector is connected with an input end of the dual rate trans-impedance amplifier for converting a received optical signal into a photocurrent and sending the photocurrent to the dual rate trans-impedance amplifier;

an output end of the dual rate trans-impedance amplifier is connected with an input end of the first controllable switch, an input end of the second controllable switch, an input end of the third controllable switch, and an input end of the fourth controllable switch respectively for generating a differential data signal, a data positive end of the differential data signal is connected with the input end of the first controllable switch and the input end of the second controllable switch respectively, and a data negative end of the differential data signal is connected with the input end of the third controllable switch and the input end of the fourth controllable switch respectively;

an output end of the first controllable switch is connected with a data positive input end of the low-speed limiting amplifier;

an output end of the second controllable switch is connected with a data positive input end of the high-speed limiting amplifier;

an output end of the third controllable switch is connected with a data negative input end of the low-speed limiting amplifier;

an output end of the fourth controllable switch is connected with a data negative input end of the high-speed limiting amplifier;

an output end of the low-speed limiting amplifier and an output end of the high-speed limiting amplifier are respectively connected with a system host for amplifying respectively received differential data signals and then respectively sending the signals to the system host; and a control end of the first controllable switch, a control end of the second controllable switch, a control end of the third controllable switch, and a control end of the fourth controllable switch are respectively connected with the system host for acquiring a rate selection control signal from the system host, so as to control switch-on or switch-off of the first controllable switch, the second controllable switch, the third controllable switch, and the fourth controllable switch.

2. The dual rate receiving device according to claim 1, wherein the low-speed limiting amplifier data path further comprises a low pass filtering circuit, the output end of the first controllable switch is connected with a data positive input end of the low pass filtering circuit, and the output end of the third controllable switch is connected with a data negative input end of the low pass filtering circuit; and an output end of the low pass filtering circuit is connected with an input end of the low-speed limiting amplifier for filtering and removing a high-frequency noise of the dual rate trans-impedance amplifier.

3. The dual rate receiving device according to claim 1, wherein the channel switching circuit further comprises a first alternating current (AC) coupling capacitor and a second AC coupling capacitor, a data positive end of a differential data signal output by the dual rate trans-impedance amplifier is connected with an input end of the first AC coupling capacitor, and the input end of the first controllable switch and the input end of the second controllable switch are connected together to be connected with an output end of the first AC coupling capacitor, for isolating the dual rate trans-impedance amplifier from a data positive end direct current (DC) working level of the high-speed limiting amplifier data path and the low-speed limiting amplifier data path; and a data negative end of the differential data signal output by the dual rate trans-impedance amplifier is connected with an input end of the second AC coupling capacitor, and the input end of the third controllable switch and the input end of the fourth controllable switch are connected together to be connected with an output end of the second AC coupling capacitor, for isolating the dual rate trans-impedance amplifier from a data negative end DC working level of the high-speed limiting amplifier data path and the low-speed limiting amplifier data path.

4. The dual rate receiving device according to claim 1, further comprising a bias voltage circuit, wherein an output end of the bias voltage circuit is connected with an input end of the photodetector for generating a bias voltage required by the photodetector.

5. The dual rate receiving device according to claim 1, wherein the photodetector is a positive-intrinsic-negative (PIN) photo diode or avalanche photo diode (APD).

6. The dual rate receiving device according to claim 4, wherein the bias voltage circuit is a PIN photo diode bias voltage circuit or APD bias voltage circuit.

7. The dual rate receiving device according to claim 1, wherein the dual rate optical receiving component and the channel switching circuit, the channel switching circuit and the low-speed limiting amplifier data path, the channel switching circuit and the high-speed limiting amplifier data path, as well as a data output of the optical transceiver module and the system host are connected through DC coupling or AC coupling in a single-end or differential manner.

8. The dual rate receiving device according to claim 1, wherein the dual rate trans-impedance amplifier is a 10 G/1.25 G trans-impedance amplifier, the low-speed limiting amplifier is a 1.25 G limiting amplifier, and the high-speed limiting amplifier is a 10 G limiting amplifier.

* * * * *